(12) United States Patent
Fey

(10) Patent No.: US 8,000,003 B2
(45) Date of Patent: Aug. 16, 2011

(54) FLUORESCENCE MICROSCOPE

(75) Inventor: Franciscus Henricus Alphonsus Gerardus Fey, Eindhoven (NL)

(73) Assignee: C.C.M. Beheer B.V., Nuenen (NL)

( * ) Notice: Subject to any disclaimer, the term of this patent is extended or adjusted under 35 U.S.C. 154(b) by 580 days.

(21) Appl. No.: 12/088,139

(22) PCT Filed: Oct. 3, 2006

(86) PCT No.: PCT/NL2006/000497
§ 371 (c)(1),
(2), (4) Date: Jun. 6, 2008

(87) PCT Pub. No.: WO2007/040390
PCT Pub. Date: Apr. 12, 2007

(65) Prior Publication Data
US 2009/0225410 A1   Sep. 10, 2009

(30) Foreign Application Priority Data
Oct. 3, 2005   (NL) ..................................... 1030102

(51) Int. Cl.
*G02B 21/00* (2006.01)

(52) U.S. Cl. ................... 359/368; 359/385; 356/318
(58) Field of Classification Search .......... 359/368–384, 359/385; 356/317, 318
See application file for complete search history.

(56) References Cited

U.S. PATENT DOCUMENTS

| 5,149,972 | A | 9/1992 | Fay et al. |
| 5,753,014 | A | 5/1998 | Van Rijn |
| 2002/0043625 | A1 | 4/2002 | Shimizu et al. |
| 2003/0218746 | A1* | 11/2003 | Sampas .......................... 356/318 |
| 2005/0046836 | A1* | 3/2005 | Olschewski ................... 356/318 |
| 2005/0111090 | A1 | 5/2005 | Kleinteich et al. |
| 2005/0237605 | A1* | 10/2005 | Vodyanoy et al. ............ 359/385 |

FOREIGN PATENT DOCUMENTS
EP   0539888 A1   5/1993

OTHER PUBLICATIONS

Van Dijk, B.; Miljarden gaatjes als businessmodel; Het Financieele Dagblad, Dec. 30, 2003; p. 18.

* cited by examiner

*Primary Examiner* — Alessandro Amari
(74) *Attorney, Agent, or Firm* — Hoffmann & Baron, LLP

(57) ABSTRACT

The invention provides a fluorescence microscope and a method for using this to measure fluorescence. The microscope comprises a silicon wafer filter membrane which is highly-planar and does not fluoresce. Moreover, it has a very high perforation density, so that a small surface area is sufficient for effective measurement. Using a camera as the location-sensitive detector moreover makes it possible to take advantage of better optical resolution, which means that optics having a smaller numerical aperture and a smaller magnification factor can be employed, with a greater working distance. All these factors together provide a fluorescence microscope capable of much more rapid measurements than the existing fluorescence microscopes.

20 Claims, 1 Drawing Sheet

FLUORESCENCE MICROSCOPE

CROSS-REFERENCE TO RELATED APPLICATIONS

This application is the National Stage of International Application No. PCT/NL2006/000497, filed Oct. 3, 2006, which claims the benefit of Netherlands Application No. NL 1030102, filed Oct. 3, 2005, the contents of which is incorporated by reference herein.

FIELD OF THE INVENTION

The present invention relates to a fluorescence microscope.

In particular, the present invention relates to a fluorescence microscope comprising a housing with an excitation light source which is designed to emit excitation light, a filtering means which separates excitation light from fluorescent light generated by a fluorescent substance, an object lens, a substrate holder, a location-sensitive light detector, and an imaging lens for the location-sensitive light detector.

BACKGROUND OF THE INVENTION

Fluorescence microscopes of this type are widely used in fluorescence studies in which a fluorescent sample or specimen is studied. If required, a sample which does not fluoresce per se can be provided with a fluorescent substance. If such a sample or specimen is irradiated with suitable light, usually but not exclusively visible light or ultraviolet light, the fluorescent substance in the sample will light up with fluorescent light which has a longer wavelength than the excitation light. Frequently, the intensity of the fluorescence is low, which means that in virtually all cases the excitation light is filtered out with the aid of a filter. The weak fluorescence is then, in principle, the only visible image.

In practice, fluorescence studies are often carried out on microorganisms. This usually involves higher magnification, preferably more than 50 times up to 100 times at the objective, and around 1000× in total to enable inspection by means of the human eye. On top of this, a typical size of a substrate used is, for example, a diameter of 25 mm. Such a size is often necessary, for example, in the case of micro-biological samples, where a certain amount of sample fluid should pass through the substrate in order to get the microbiological particles which are to be studied subsequently, concentrated on the substrate. In the process, the sample fluid passes through thin perforations in the substrate, and the particles remain behind on the surface of the substrate.

A drawback of the known fluorescence microscope is that the measuring time can become very long. In the case, for example, of microbiological studies at a desired resolving power less than 1 micrometer and a substrate having a diameter of 25 mm, with a measuring time of a few seconds per image, a total measuring time of many hours up to a day, even, is not exceptional.

SUMMARY OF THE INVENTION

It is an object of the present invention to provide a fluorescence microscope which permits a much shorter measuring time while retaining resolving power.

This object is achieved by means of a fluorescence microscope according to the invention, comprising a substrate which comprises a wafer-based filter membrane made of a material suitable for lithographic processing techniques, wherein the filter membrane comprises a pattern of continuous perforations introduced lithographically.

In particular, the filter membrane is fabricated with the aid of a wafer. The fact is that such wafers can be made particularly flat, so that the filter membranes which adopt the surface shape of the wafer can likewise be made extraordinarily flat, in particular so flat that substantially the entire substrate surface can be imaged in sharp focus for a setting of a fluorescence microscope in which a resolving power of 1 micrometer or less is provided, for example, 0.5 µm. This implies that the substrate, over a diameter of for example 3 mm, should be flat to within 0.5 µm.

Lithography, on the one hand, provides techniques for providing such a flat substrate and, on the other hand, makes it possible to introduce very many, well-defined perforations into the substrate. Conceivably, the porosity is 5-20%, even up to 40%, with a perforation size of, for example, 0.1-1 µm. As a result, the substrate can advantageously be made much smaller, as will be explained in more detail hereinafter. Moreover, filtrates involving substrates of this type (perforation size less than 0.19 µm) will be sterile.

Filter membranes of this type, made of silicon, are provided by fluXXion. The silicon filter membranes from fluXXion have an additional advantage of being very thin, and, owing to the large number of perforations, which furthermore are very well-defined, having very high transmittance. As a result, substrates can be provided having significantly smaller dimensions than the substrates customarily used hitherto while still having the same total transmittance. It is possible, for example, to replace a prior art substrate having a diameter of 25 mm by a silicon filter membrane having a diameter of, in particular, less than 10 mm and, for example, 3 mm. This means that the materials to be studied, located in a sample fluid, are at a much higher concentration, having been passed through the filter membrane, than for prior art substrates. In practice this also implies that a much smaller area need be studied. For example, a reduction in the area to be studied from a diameter of from 25 mm to 3 mm squared means that time is saved by about a factor of 50.

For that matter, the substrate, i.e. the filter membrane, need not be made of silicon but can be fabricated, as mentioned earlier, from a material suitable for lithographic techniques. In particular, the substrate consists substantially of silicon, a silicon compound, sapphire, a silicate glass or a combination thereof. Such materials have a proven suitability for these techniques, good mechanical properties, good chemical resistance and low inherent fluorescence. Conceivable combination materials include, for example, so-called SoS, silicon on sapphire.

More particularly, the substrate substantially comprises silicon. This element is eminently suitable for lithographic processing, and the relevant techniques have been optimally developed.

In particular, a surface of the substrate can be doped with one or more elements, in order thus to improve one or more properties, especially hardness or chemical resistance. Advantageously, the substrate has a nitrided or carburized surface. Nitriding or carburizing the silicon substrate locally produces a very hard and durable layer of silicon nitride or silicon carbide, respectively, thereby further improving the mechanical properties.

In an advantageous embodiment, the substrate substantially comprises silicon carbide or silicon dioxide. Instead of just the surface being carburized, the entire substrate can also be fabricated substantially from silicon carbide, an alternative being quartz (silicon dioxide).

Another problem which often occurs in prior art fluorescence microscopy is that the substrate may fluoresce. This means that a background signal or noise is present in the fluorescence measurements. This background signal can interfere with the genuine measurements, i.e. of the materials to be studied. It is therefore desirable to provide a substrate which does not fluoresce or only at a low level. This object is achieved by the substrate comprising substantially the above-mentioned materials.

Advantageously, the surface of the substrate is coated with a metal layer on at least one side. Such a measure ensures even lower inherent fluorescence of the substrate. This provides advantages precisely on the substrates according to the invention in which perforations are produced lithographically. In so doing, chemicals are often used, residues of which could cause fluorescence. These residues are now, together with the "genuine" substrate, masked by a thin metal layer. One example of such a metal layer is a vapour-deposited chromium layer, although other metals are also possible.

A further important point relates to the sharp focusing on the substrate. After all, even if a perfectly flat substrate is used, it may still be necessary for each newly studied section of the substrate in turn to be brought into sharp focus, since the substrate need not be located in the sharp focusing plane of the microscope. As a matter of fact, the height with respect to the sharp focusing plane could be determined for each position. For a perfectly, or at least sufficiently, flat substrate, it is sufficient, however, to carry out a 3-point measurement of the sharp focusing point, thereby determining the position of the substrate with respect to the sharp focusing plane of the microscope. The substrate can then be tilted so as to indeed be located in the sharp focusing plane of the microscope. An alternative option then is a simple calculation for each position of the desired sharp focusing correction which then, if required, can be performed automatically. As the substrate is moved, sharp focusing can then be automatically controlled. In this embodiment, too, the flat substrate will save a great deal of focusing time.

In an attractive embodiment, the fluorescence microscope comprises a focusing illumination system having a focusing light source which is designed to emit focusing light, wherein an optical path of the focusing light and an optical path of the fluorescent light run coaxially via the object lens towards the substrate. This therefore involves, during use of the fluorescence microscope, light being shone onto the substrate during the focusing operation. The section of the optical path for the focusing light from the substrate to the detector is the same as the one for the fluorescent light. In other words, it is possible to produce an image of the substrate both with focusing light and with fluorescent light. This provides the option of correlating the fluorescent image with an ordinary optical image of the substrate, together with sample or specimen. This can be beneficial for interpreting the fluorescent images, and, for example, to strip them of artefacts.

In such an arrangement, the focusing light can, in principle, comprise ordinary visible light. If required, the focusing light comprises only part of the visible spectrum. Advantageously, the focusing light substantially comprises light in a wavelength region outside the excitation light which, after all, will be reflected away by the mirror or the like which directs the excitation light onto the substrate. For example, the focusing light substantially comprises light having a wavelength around or equal to that of fluorescent light or even substantially fluorescent light.

The fluorescence microscope further preferably comprises a mirror which partially transmits focusing light and is positioned in such a way in an optical path of the focusing light that light coming from the substrate is directed towards the light detector. This affords the option of providing the focusing light via the object lens. In other words, the focusing light is radiated onto the substrate via the same optics as those employed for collecting the reflected focusing light used to form a focusing image. Here it is important that the substrate be entirely flat, and preferably specular, such as, for example, a silicon wafer filter membrane. This has the advantage, inter alia, that while the specimen or sample is viewed, only the section being viewed at that instant is irradiated with focusing light. This is beneficial given the often rapid light-induced bleaching of the specimen or sample or similarly caused breakdown of the fluorescent substance. Another advantage is that the focusing light is supplied on the side identical with the side from which the fluorescent light is emitted. As it happens, a transparent substrate is another option. This, however, is not very effective with the wafer filter membrane since this, via the continuous perforations, in fact forms an optical element having a very small numerical aperture and thus very large depth of focus. This in turn means that sharp focusing from below on the focusing light becomes difficult, "sharp" relating to the focusing of the specimen or sample with respect to the imaging optics and the camera. These optics, after all, have a much smaller numerical aperture than the effective numerical aperture of the continuous perforations in the filter membrane.

It should be noted, however, that focusing light can also be supplied via some other optical path, for example, obliquely incident onto the substrate, e.g. by means of a focusing light source which supplies focusing light all around the objective lens. In this embodiment, too, the present invention does provide advantages, since the working distance is generally larger, for the optical settings chosen, than in prior art fluorescence microscopes, and certainly greater than in immersion optics microscopes. These points will be explained below in more detail.

When using a camera employing pixels as the location-sensitive detector, the so-called pixel resolution is preferably at least as good as the optical resolution of the fluorescence microscope, in order to retain as much of the information as possible from the optical image detected by means of the camera. The pixel resolution is simply the pixel size divided by the magnification scale and is preferably between ⅓ and 1× the optical resolution, i.e. the pixel resolution is preferably at least as good as the optical resolution (information retention), but preferably at most 3× better, i.e. ⅓× the optical resolution. After all, an even "better" pixel resolution would merely produce the semblance of a higher effective resolution, since that information was not actually present in the optical image provided.

If a modest optical resolution is then chosen, i.e. no greater than necessary, particularly on the basis of the characteristics of the camera and not those of the human eye, a lesser magnification may be sufficient. This carries the major advantage that the number of pixels required can be kept down or at least that the relationship between the image field measured and the number of pixels is favourable. That number of pixels determines not only the price and complexity of the camera, but also, above all, the read-out speed. Alternatively, it is possible to use only a limited number of pixels of a CCD present to record the image, not more pixels than necessary to achieve the desired resolution. In both cases, a small number of pixels means a high read-out speed and thus a more rapid measurement.

To give an example, a desired resolution is 0.5 µm, and green light having a wavelength of 530 nm is used. The corresponding numerical aperture then is at least 0.40. For pixel sizes of 5 µm and a desired pixel resolution of 0.5× the optical resolution, i.e. 0.25 µm, this results in a required magnification factor for the camera of 20× in total. A feasible option in practice then is to choose, for example, an objective lens of f=10 mm and an imaging lens of f=200 mm. These are focal lengths which permit compact construction of the microscope whilst still permitting a working distance of around 2 cm. Obviously, other desired resolutions are possible, as are other fluorescent wavelengths, pixel size, ratios between pixel resolution and optical resolution, preferably between 1:1 and 1:3, and focal lengths of object lens and imaging lens, the latter obviously optionally being compound lens systems.

In the abovementioned manner it is possible to ensure that the strength or magnification factor of the object lens can be kept low, while the total magnification is still sufficient, in combination with the small pixel sizes, to achieve the desired resolving power. An additional advantage is that the numerical aperture (NA) of the object lens need not be kept particularly large, meaning that immersion at large magnifications is not necessary.

In fact, an estimate of the required NA for the microscope is produced on the basis of the desired resolution when a camera is used instead of the human eye, and the required magnification factor is then determined on the basis of pixel size and desired pixel resolution.

A major advantage of lenses having a relatively small NA, advantageously 0.45 and less, is that the depth of focus is relatively large. This in turn means that renewed sharp focusing of the substrate is not required or at least required less frequently, and that even a relatively thicker substrate can still be measured in its entirety without adjustment of the microscope.

This offers advantages, particularly in combination with the very flat wafer filter membrane, since complete measurement of the substrate is now possible with a single sharp focusing operation. As a matter of fact, the wafer filter membrane forms a two-dimensional substrate, allowing sharp focusing on the holes in the membrane at the surface thereof, while at the same time the specimen or sample is positioned directly on that surface.

Immersion in, for example, water or oil always entails evaporation of the respective immersion fluid, which is often undesirable. Moreover, it is possible, and this a more significant drawback, for contamination to occur in the form of cross-contamination with different specimens. This can occur not simply as a result of evaporation of the immersion fluid, for example entraining microorganisms or other material, but also as a result of such material being transferred via the immersion fluid from one specimen to another. Given the small magnification factor of the object lens, the present invention provides a simple way of setting a large working distance and thus preventing contamination.

Advantageously, the partially transmitting mirror comprises a mirror or so-called polka-dot beam splitter, the ratio between reflection coefficient and transmission coefficient for the focusing light being at least 10, and advantageously at least 100. Preferably, the ratio between the reflection coefficient and transmission coefficient for fluorescent light is at least 100. In the case of coaxial injection of the focusing light, an optical element is present which first partially transmits the focusing light and then partially reflects it towards the detector, or vice versa if the positions of the detector and focusing light source are interchanged.

The invention further relates to a method of detecting fluorescence of a specimen on a substrate, utilizing a fluorescence camera according to any one of the preceding claims, comprising the irradiation of the specimen on the substrate with excitation light, and detecting fluorescent light from the specimen. By using the fluorescence microscope according to the invention, in particular the silicon wafer substrate, it is possible to achieve remarkable time savings in the fluorescence measurements. Moreover, there is no or virtually no fluorescence caused by the substrate.

In particular, the focusing light source substantially emits focusing light only when the specimen is brought into focus. As a result, there is less bleaching of the specimen or sample on the substrate. By virtue of the illumination with focusing light being preferably coaxial with the excitation radiation, it is possible to alternate between focusing light images, which produce a visible light image if required, and fluorescent images, correlation between these being readily possible. In the event of the substrate being relocated, with renewed sharp focusing if required, a focusing light source can simply be switched on for a short (focusing) time.

Furthermore, the focusing light source emits very little light, or at least very little light reaches the specimen or sample. The focusing light, in principle, is restricted to a level necessary to permit sharp focusing, thus allowing bleaching and other disadvantageous effects on the specimen or sample to be minimized. Obviously, said light level can be higher if the specimen will not suffer as a result, thus permitting sharp focusing to be more rapid and/or more accurate.

In a specific embodiment, the fluorescence is detected from each of a number of subareas of the specimen on the substrate, relevant image information is then determined from the fluorescence detected in a subarea, the subareas being randomly chosen from the specimen, and where measurement of the fluorescence is discontinued if the relevant image information from all the subareas measured up until then in sum exceeds a predetermined confidence level threshold. Thus the measuring time can be reduced still further. A threshold should then be chosen in advance which will indicate at which point a particular specimen or sample will have been measured to a sufficient confidence level. A simple example is that of requiring the presence of a particular microorganism to be established. There, after all, it is sufficient to detect one or a number of individuals of that microorganism. Obviously, it is also possible to choose a (legal) standard value as the threshold value, it being sufficient to establish whether that standard has been exceeded, etc. Incorporating the detection of threshold being exceeded in this manner can be effected, for example, and preferably, by means of automated pattern recognition equipment.

The invention also provides a substrate for use in a fluorescence microscope according to the invention, comprising a wafer-based filter membrane made of a material suitable for lithographic processing techniques, wherein the filter membrane comprises a pattern of continuous perforations introduced lithographically, the surface of the substrate being coated with a metal layer on at least one side. Owing to the metal layer, residual inherent fluorescence of material of the substrate can be efficiently suppressed. As far as the base materials of the substrate and the types of metal in the metal layer are concerned, use can be made of the materials already described hereinabove.

The invention also provides a method of fabricating the substrate according to the invention, comprising the steps of providing a wafer-based filter membrane, providing the filter membrane with perforations by means of a lithographic technique, and then coating at least one side of the filter membrane with a metal layer. As described hereinabove, the perforations can, for example, have a diameter of between 0.1 and 1 µm, although other diameters or shapes are not excluded. It should be noted that it is also possible for the metal layer to be vapour-deposited first and for the perforations to be introduced afterwards, which has the advantage that the inside of the perforations is free from metal. In that case, however, the metal might interfere with the lithographic steps, and it would furthermore be possible for residual lithographic chemicals to remain behind, which carries the risk of residual fluorescence.

The fluorescence microscope, the method and the substrate according to the invention inter alia provide a gain in speed of fluorescence measurements. Said gain in speed results, inter alia, from the use of the wafer filter membrane, which leads to a gain in speed by virtue of providing, compared with known substrates, an equally efficient filter on a much smaller surface area, which therefore can be tested more rapidly. Moreover, it is a flat filter which does not require sharp focusing again and again. A three-point measurement is sufficient, any subsequent control required being able to be effected automatically. Furthermore, use is made of a camera which provides better resolving power than the human eye, thus permitting a smaller numerical aperture of the lenses used. This means less expensive lenses, and in many cases immersion is no longer necessary. On top of that, a smaller magnification factor is sufficient, at least if the pixels of the camera are not too large in terms of the desired optical resolving power, thereby permitting longer focal lengths to be employed, resulting in a larger working distance. This in turn has advantages in preventing contamination via immersion. In addition, it is beneficial to stop measuring once the observed statistics give cause to do so. All in all, the fluorescence microscope, the method and the substrate according to the invention can be used for measuring fluorescence very rapidly, reliably, and in a contact-free manner.

The invention will be explained below with reference to the drawing, whose single FIGURE is a schematic depiction of a cross section of a fluorescence microscope according to the invention.

DETAILED DESCRIPTION OF PREFERRED EMBODIMENTS

Figure 1:
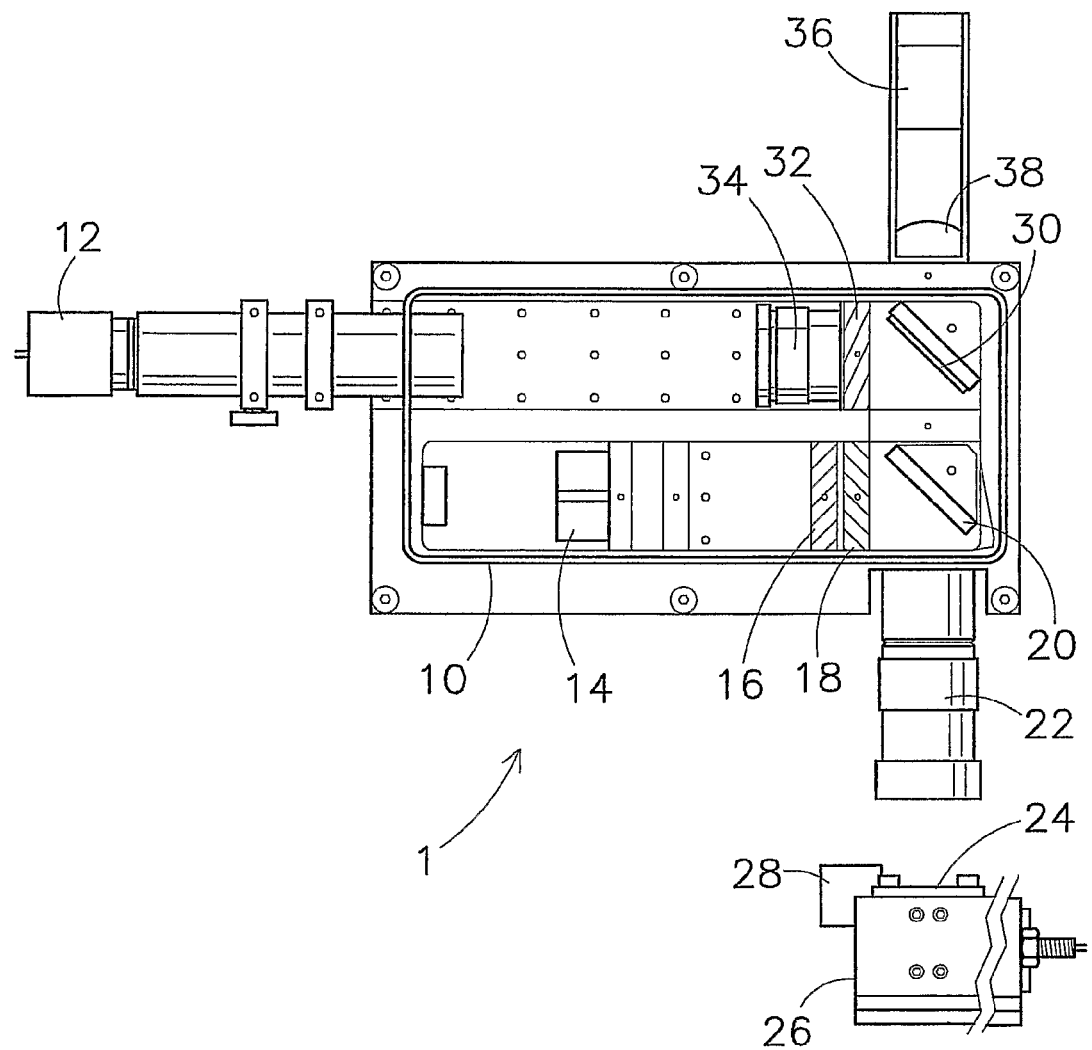
FIG. 1 shows a fluorescence microscope according to the invention in cross section.

The fluorescence microscope is generally designated by reference numeral 1 and comprises a housing 10 with a camera 12 mounted thereon. Provided in the housing 10 is an excitation light source 14, together with a first lens 16, an excitation filter 18 and a dichroic mirror 20.

Provided in FIG. 1 at the bottom of the housing 10 is object lens 22, via which a substrate 24 can be illuminated. The substrate 24 is accommodated in a substrate holder 26, while 28 indicates an x-y-z substrate translation stage.

Reference numeral 30 indicates a partially transmitting mirror or beam splitter, 32 an emission filter, and 34 an imaging lens.

Indicated on top of the housing 10 are a focusing light source 36 and a focusing lens 38.

The housing 10 of the fluorescence microscope 1 according to the invention is a substantially light-tight housing. Housing 10 can in principle be made of any material such as metal and/or plastic. Arranged in the housing 10 are a number of optical and other components.

An excitation light source 14 is disposed in the housing 10, to provide excitation light. The excitation light source can in principle comprise any light source suitable for this purpose, such as one or more LEDs, a (high-pressure) mercury lamp, a laser, etc. The wavelength of the excitation light of the excitation light source 14 is selected as a function of the fluorescent materials to be studied, but in general is light of relatively short wavelengths. Commonly used wavelengths are in the green up to and including the near ultraviolet region, but other wavelengths are not ruled out. In this case, for example, the excitation light source 14 is a blue LED source.

The light emitted by the excitation light source 14 passes through a first lens 16, designed to form a suitable excitation light beam, for example of sufficiently high homogeneity. The light beam also passes through an excitation filter 18 which is designed to filter out unwanted light fractions. In particular this relates to light fractions from the excitation light which correspond to the fluorescent light. Such a fraction in the excitation light might, after all, interfere with the subsequent fluorescence measurement. If required, the excitation filter 18 can also be set so as to remove a portion of greater or lesser magnitude of the light other than excitation light or fluorescent light. Possible noise resulting from light not relevant to the fluorescence measurement is thus prevented as far as possible. Suitable filters can readily be selected by those skilled in the art, depending on what types of excitation light and/or fluorescent light are being used. If required, the excitation filter can comprise 2 or more subfilters.

Whilst in the present case the excitation light source is shown within the housing 10, it is also possible to install the excitation light source outside the housing 10, a light-tight coupling being provided, if required, between the excitation light source 14 and the housing 10—see also the coupling with the camera 12, to be discussed hereinafter.

The excitation light thus collimated and filtered is radiated towards the substrate 24 via a dichroic mirror 20 and via object lens 22. The dichroic mirror 20 is designed, for example, so as to reflect as much of the excitation light as possible, whereas fluorescent light coming from the substrate 24 passes through with high transmittance. All this can be easily achieved, as known to those skilled in the art, by means of suitable stacking of dielectric layers.

The object lens 22 can, for example, be a standard microscope objective, having a magnification factor of, for example, between 10 times and 45 times. The numerical aperture can, for example, be between 0.2 and 0.5. The working distance can, for example, be a few millimeters and can even be up to a few centimeters. It should be noted that this working distance is sufficient to allow contact-free measurements of the substrate 24.

The substrate 24 can, in principle, be any substrate suitable for this purpose, for example a glass slide or the like. For microbiological measurements, in particular, substrates are often used which are provided with many small perforations. Prior to the measurement, for example, a sample containing microorganisms or the like to be studied is made to pass through the substrate, with the material to be studied remaining behind, while the fluid can drain away through the perforations in the substrate. Typical substrates used for these tests comprise, for example, polymer substrates. Advantageously, however, the substrate 24 comprises a silicon membrane filter, for example. Silicon membrane filters of this type, for example marketed by fluXXion, are fabricated from silicon which does not fluoresce or does so only at a very low level and as a result cannot interfere with any fluorescence measurements. Furthermore, silicon filter membranes of this type are fabricated on the basis of a silicon wafer as used in semiconductor technology. The silicon filter membranes are therefore also very flat, which means that in an arrangement perpendicular to the optical axis of the fluorescence microscope it is possible overall to achieve a sharp image without adjustment, even at high magnification. Another advantage of silicon filter membranes of this type is that the permeability is very high, owing to the large number of perforations which, moreover, are defined within very narrow limits. This means that the filter membrane can be highly selective during filtration and also means that the dimensions of the substrate 24 can be kept very low and still permit an identical amount of sample fluid to be filtered within a length of time customary in practice. A silicon filter membrane having a cross section of, for example, 3 millimeters can be sufficient for this purpose, other dimensions obviously also being possible.

The substrate 24 is accommodated in a substrate holder 26 which comprises a substrate translation stage 28 (shown in outline only). The substrate translation stage 28 is used to translate the substrate 24 in directions located in the image plane of the fluorescence microscope 1, here also referred to as x and y direction, and in addition, for the purpose of sharp focusing, also in the direction perpendicular thereto, here also referred to as the z direction. Additionally, the substrate translation stage can be designed for tilting the substrate 24 in such a way around the x- and/or y-axis that the substrate surface is located in the sharp focusing plane of the fluorescence microscope 1. This latter feature is advantageous, since the highly planar silicon filter membrane substrate is capable of being aligned in its entirety in the sharp focusing plane by means of a three-points measurement. Furthermore, the substrate is so flat, and the depth of focus so large in the fluorescence microscope according to the invention that the entire substrate remains within the depth of focus over the entire x, y translation. The z-value then can be set simply as a function of x and y, for example a linear combination of x and y.

The excitation light of the excitation light source 14 incident on the substrate 24 carrying the materials to be studied will there be able to give rise to fluorescence. The fluorescent light generated as a result will in turn, via the object lens 22, enter the housing 10 where it will substantially pass the dichroic mirror 20. Then the fluorescent light will fall on the partially transmitting mirror 30 and be reflected thereby, towards the camera 12. First, however, it passes through an emission filter 32 which is designed for substantially transmitting fluorescent light only. To put it in more general terms, the purpose of the emission filter 32 is to improve the ratio between fluorescent light and other light, particularly excitation light. In principle, it might even be sufficient for emission filter 32 likewise to lock only the excitation radiation to a large extent, but the emission filter 32 can also serve for selecting a particular type of fluorescence. After all, materials other than those to be studied may fluoresce, particularly the substrate. If a silicon filter membrane is used as a substrate 24, this type of fluorescence is usually negligible, however.

The fluorescent light then passes through imaging lens 34, having a wavelength, for example, of 530 nm. The camera 12 can be a CCD camera or the like, having a pixel size of 10 micrometers or less. In a concrete example, the pixel size is 4.65 µm, for example, and a desirable ratio between pixel resolution and optical resolution is at least a factor of 2. For a required optical resolving power of, for example, about 0.5 µm, the pixel resolution then, for example, is 0.23 µm, and the requisite magnification factor is about 20. For example, the objective lens 22 has a focal length of 10 mm and an NA of 0.42, and the imaging lens 34 has a focal length of 200 mm. Given such a combination, a beneficial, i.e. sufficiently large working distance at the objective lens 22 is also achieved.

As an alternative to the CCD camera 12, it would also be possible to use, for example, a CMOS camera or, for example, a photographic plate. A CCD camera or CMOS camera has the advantage that the images can be processed electronically, and as already stated they have a better effective optical resolution than the human eye. To this end, the camera 12 can, for example, be linked to a computer equipped with image processing and/or image recognition equipment and/or software (not shown).

It should be noted that the ray path of the fluorescent radiation shown in FIG. 1, i.e. via the partially transmitting mirror 30 towards the camera 12, was chosen with regard to the focusing light source 36. In the absence of the focusing light source 36, the camera could also have been positioned in the location of said focusing light source 36, the partially transmitting mirror 30 effectively becoming superfluous as a result. The fluorescence microscope 1 depicted in FIG. 1 does incorporate, however, a focusing light source 36. Its purpose is to employ a sufficient amount of light to be able to position, in a simple manner, the substrate 24 in the sharp focusing plane of fluorescence microscope 1. To this end, the focusing light source 36, for example, emits white light or green light, in particular light which is transmitted by the emission filter 32 and obviously the dichroic mirror 20. The colour of the light to be emitted by the focusing light source 36 therefore depends on the colour of the light from the excitation light source 14 and on the colour of the fluorescent light. All these aspects can be readily chosen by those skilled in the art. The focusing light source 36 can in turn, for example, be an LED source or alternatively a (halogen) incandescent lamp or (high pressure) mercury vapour lamp. Other light sources are likewise possible. Advantageously, an LED source is used, whose benefits include the option of rapid switch-over, thereby obviating the need for a mechanical shutter, rotary mirror or the like, as well as long service life and effective illumination owing to high intrinsic efficiency and a relatively narrow bandwidth, meaning that filters and substrate need to deal with relatively low power. These advantages, incidentally, apply equally in the case where the excitation source comprises an LED source.

The purpose of the focusing lens 38 is to obtain a sufficiently homogeneous light beam, which is conducive to sharp focusing. Another benefit is that during the process of focusing, also referred to as aligning, the substrate 24, the possibly present materials to be studied, particularly labelled bacteria, will not be bleached. This would have an adverse effect on the fluorescence measurements to be subsequently carried out. To prevent bleaching, the focusing light source 36 is used solely during focusing. It is also beneficial to select a high ratio between the light intensities of excitation light and the light from the focusing light source 36 as it reaches the substrate 24. Using the above-described LED sources for the excitation light source 14 and the focusing light source 36, for example, a ratio between excitation light and aligning light of 2000:1 can readily be achieved. Between the partially transmitting mirror 30 and the focusing lens 38, a second emission filter can optionally be positioned which can substantially correspond to the emission filter 32. In such a case, a ratio of 10 000:1 can readily be achieved. Given such ratios, any bleaching, by the focusing light, of the materials to be studied can be reliably avoided. The use of flat, small substrates has the additional advantage that sharp focusing need only be carried out a small number of times.

A general comment regarding the use of the term "lens" is that in all instances this lens can also be a compound lens, i.e. comprising a plurality of optical elements. Furthermore, in principle, the positions of the emission filter 32 and the excitation filter 18 with respect to associated lenses, the imaging lens 34 and the illuminating lens 16, can be reversed.

The embodiments described should be regarded as nonlimiting examples. The scope of protection of the invention is defined by the appended claims.

What is claimed is:

1. Fluorescence microscope comprising:
    a housing with an excitation light source which is designed to emit excitation light,
    a filtering means which separates excitation light from fluorescent light generated by a fluorescent substance,
    an object lens,
    a substrate holder,
    a location-sensitive light detector,
    an imaging lens for the location-sensitive light detector,
    a substrate which comprises a wafer-based filter membrane made of a material suitable for lithographic processing techniques, and
    a focusing illumination system having a focusing light source which is designed to emit focusing light, wherein an optical path of the focusing light and an optical path of the fluorescent light run coaxially via the object lens towards the substrate,
    wherein the filter membrane comprises a pattern of continuous perforations introduced lithographically.

2. Fluorescence microscope according to claim 1, wherein the substrate consists substantially of silicon, a silicon compound, sapphire, a silicate glass or a combination thereof.

3. Fluorescence microscope according to claim 2, wherein the substrate substantially comprises silicon or silicon carbide or silicon dioxide.

4. Fluorescence microscope according to claim 3, wherein the substrate has a nitrided or carburized surface.

5. Fluorescence microscope according to claim 1, wherein the surface of the substrate is coated with a metal layer on at least one side.

6. Method of detecting fluorescence of a specimen on a substrate, utilizing a fluorescence microscope according claim 1, comprising
    the irradiation of the specimen on the substrate with excitation light, and
    detecting fluorescent light from the specimen,
    wherein the fluorescence is detected from each of a number of subareas of the specimen on the substrate, relevant image information is then determined from the fluorescence detected in a subarea, the subareas being randomly chosen from the specimen, and where measurement of the fluorescence is discontinued if the relevant image information from all the subareas measured up until then in sum exceeds a predetermined confidence level threshold.

7. Method according to claim 6, wherein a focusing light source substantially emits focusing light only when the specimen is brought into focus.

8. Fluorescence microscope according to claim 1, wherein the filter membrane has a porosity in the range of 5 to 40%.

9. Fluorescence microscope according to claim 1, wherein the substrate has a diameter of less than 10 mm.

10. Fluorescence microscope according to claim 1, wherein a perforation size is in the range of 0.1 to 1.0 micrometer.

11. Fluorescence microscope comprising:
    a housing with an excitation light source which is designed to emit excitation light,
    a filtering means which separates excitation light from fluorescent light generated by a fluorescent substance,
    an object lens,
    a substrate holder,
    a location-sensitive light detector,
    an imaging lens for the location-sensitive light detector,
    a substrate which comprises a wafer-based filter membrane made of a material suitable for lithographic processing techniques,
    wherein the filter membrane comprises a pattern of continuous perforations introduced lithographically, and
    further comprising a focusing illumination system having a focusing light source which is designed to emit focusing light, wherein an optical path of the focusing light and an optical path of the fluorescent light run coaxially via the object lens towards the substrate.

12. Fluorescence microscope according to claim 11, further comprising a mirror which partially transmits focusing light and is positioned in such a way in an optical path of the focusing light that light coming from the substrate is directed towards the light detector.

13. Fluorescence microscope according to claim 11, further comprising a filter which is positioned between the partially transmitting mirror and the focusing light source and which has lower transmittance for excitation light than for fluorescent radiation.

14. Fluorescence microscope according to claim 11, wherein the substrate consists substantially of silicon, a silicon compound, sapphire, a silicate glass or a combination thereof.

15. Fluorescence microscope according to claim 11, wherein the substrate substantially comprises silicon.

16. Fluorescence microscope according to claim 15, wherein the substrate has a nitrided or carburized surface.

17. Fluorescence microscope according to claim 11, wherein the substrate substantially comprises silicon carbide or silicon dioxide.

18. Fluorescence microscope according to claim 11, wherein the surface of the substrate is coated with a metal layer on at least one side.

19. Method of detecting fluorescence of a specimen on a substrate, utilizing a fluorescence microscope according claim 11, comprising the irradiation of the specimen on the substrate with excitation light, and detecting fluorescent light from the specimen, wherein the fluorescence is detected from each of a number of subareas of the specimen on the substrate, relevant image information is then determined from the fluorescence detected in a subarea, the subareas being randomly chosen from the specimen, and where measurement of the fluorescence is discontinued if the relevant image information from all the subareas measured up until then in sum exceeds a predetermined confidence level threshold.

20. Method according to claim 19, wherein a focusing light source substantially emits focusing light only when the specimen is brought into focus.

* * * * *